H. E. JONES.
REPAIR LINK.
APPLICATION FILED AUG. 19, 1920.
1,385,554.
Patented July 26, 1921.
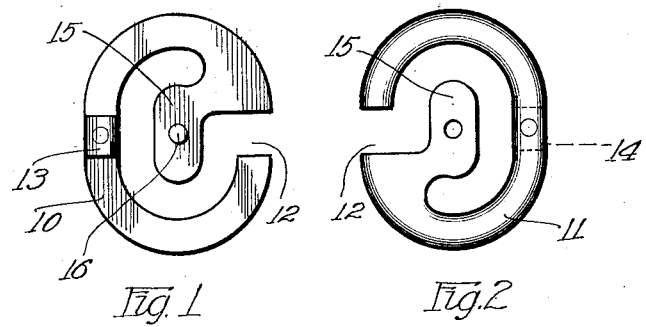
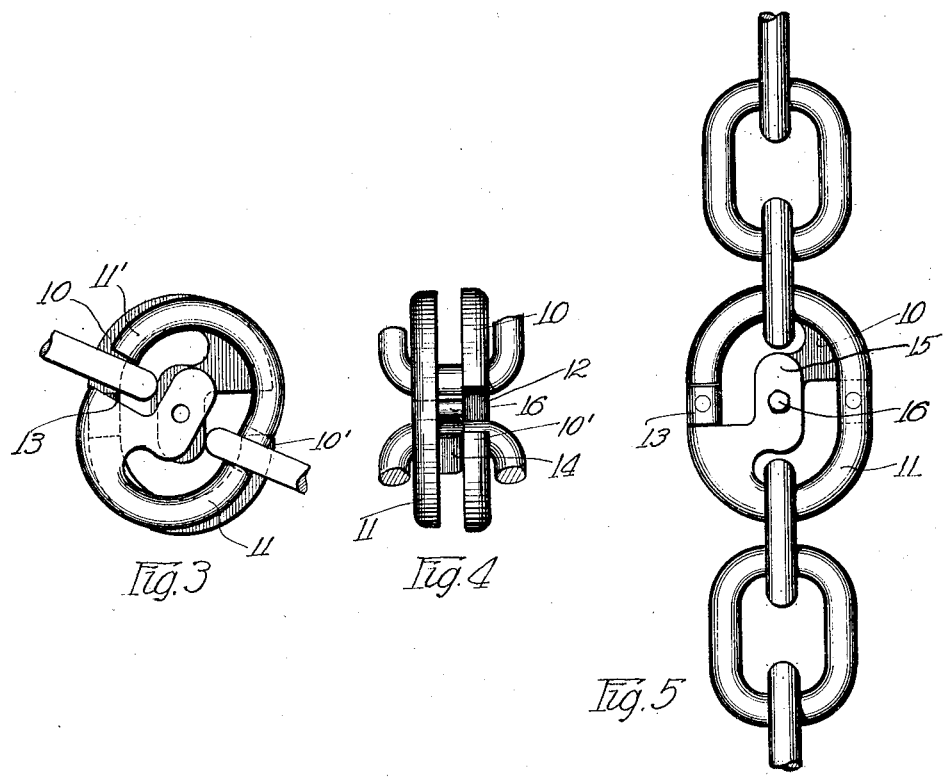
Inventor:
Hugh E. Jones

UNITED STATES PATENT OFFICE.

HUGH E. JONES, OF OSHKOSH, WISCONSIN.

REPAIR-LINK.

1,385,554.        Specification of Letters Patent.    Patented July 26, 1921.

Application filed August 19, 1920. Serial No. 404,635.

*To all whom it may concern:*

Be it known that I, HUGH E. JONES, a citizen of the United States, and resident of Oshkosh, in the county of Winnebago and State of Wisconsin, have invented a certain new and useful Improvement in Repair-Links, of which the following is a full, clear, concise, and exact description, reference being had to the accompanying drawings, forming a part of this specification.

My invention relates to improvements in repair links for chains and is particularly concerned with the provision of a link by means of which two links of a chain can be easily and quickly secured together.

The objects of my invention are,

First; to provide a link of the character described which is simple in construction, economical to manufacture and easy to apply.

Second; to provide a device of the character described which can be easily forged or otherwise produced and, Third; to provide a repair link comprising a plurality of parts and means for holding the parts together in which the holding means are subjected to practically no shearing stresses.

These and other objects of my invention will be clearly understood by reference to the accompanying drawings, in which—

Figure 1 is a side elevation of one of the complementary links forming one part of my improved repair link.

Fig. 2 is a side elevation of the opposite side of the other complementary link.

Fig. 3 is a side elevational view illustrating the method of connecting two chain links by my improved repair link.

Fig. 4 is a side view of the construction shown in Fig. 3, and

Fig. 5 is a side elevational view showing the repair link completely assembled.

Throughout the several views, similar reference characters will be used for referring to similar parts.

Referring to the drawings, the reference characters 10 and 11 respectively indicate, as a whole, the complementary links which, when assembled, form my completed repair link. The contacting faces of these two links are preferably flat, as shown in Fig. 1 and the outer sides thereof are preferably of rounded contour as shown in Fig. 2 so that when the two links are assembled with their flat sides together, they form a completed link, the sides of which are substantially round in cross section.

An entrance opening 12 is cut in each side of the links 10 and 11 for receiving the chain links to be connected. The link 10 is provided with an outwardly extending lug 13 adapted to be received in the entrance opening 12 of the link 11 when the two complementary links are brought into superimposed relation and the link 11 is provided with a similar locking lug 14 which is adapted to be received by the opening 12 of the link 10. The opposite ends of the two links, 10 and 11, are provided with inwardly extending projections 15 which, when the links are assembled as shown in Fig. 5, overlap each other and provide means for securing the two halves of the repair link together. Preferably this is accomplished by means of a stud pin 16 projecting from one of the links and sufficiently soft to permit of its outer end being swaged on.

In connecting two chain links, one of the chain links is threaded upon the link 10 to substantially the position shown in Fig. 3 and the other chain link is threaded upon the link 11 to substantially the position shown in the same figure and the two links are then brought into superimposed relation as shown in Figs. 3 and 4 whereupon, if the links are rotated in opposite directions, the end 10' of the link 10 will pass through the link previously threaded over the link 11 and the end 11' of the link 11 will be threaded through the end of the link previously threaded over the link 10. Links 10 and 11 are rotated until the locking projections 13 and 14 register with the entrance opening 12 whereupon the flat faces of the links are brought into contacting relation and the pin 16 is riveted over to maintain the two halves of the link in proper relation. It will be noted that the pin 16 and the locking projections 13 and 14 tend to prevent the longitudinal displacement of the links 10 and 11 relatively to each other and that the locking lugs 13 and 14 further prevent one of the links 10 and 11 from rotating about the pin 16 relatively to each other.

With the construction shown, however, very little shearing stress is imposed upon the rivet 16 and the locking lugs 13. The link is also strengthened by reason of the over-lapping projections 15 and the riveted connection between these two members, because two of the free ends of the links 10 and 11 are those connected and form, in effect, a closed link thus giving greater strength to the completed link than if these two free ends were left unsupported.

While I have described the details of the preferred embodiment of my invention and illustrated one use of the same, it is to be clearly understood that my invention is not limited to these details of construction nor to the use illustrated but is capable of other adaptations and modifications within the scope of the appended claims.

Having thus described my invention, what I claim is new and desire to secure by Letters Patent is:—

1. A repair link comprising two complementary links adapted to be superimposed upon each other, the said links being cut away at opposite sides to provide entrance openings for the links of the chains to be connected, one end of one link and the opposite end of the other link being provided with inwardly extending overlapping projections, means for pivotally securing said overlapping projections together, and means on each link for projecting into the entrance opening of the other link to lock said links against relative longitudinal and angular movement.

2. A repair link comprising two complementary links adapted to be superimposed upon each other, the said links being cut away at opposite sides to provide entrance openings for the links of the chains to be connected, one end of one link and the opposite end of the other link being provided with overlapping projections, means for securing said overlapping projections together, and means on each link for projecting into the entrance opening of the other link to lock said links against relative movement.

3. A repair link comprising two complementary links adapted to be superimposed upon each other, the said links being cut away on opposite sides to provide entrance openings and means on each of said links for fitting into the opening in the other link for preventing said links from moving angularly with respect to each other.

4. A repair link comprising two complementary links adapted to be superimposed upon each other, the said links being cut away on opposite sides to provide entrance openings, means for pivotally securing said links to each other and means on one of said links for coacting with the opening in the other of said links for preventing said links from moving angularly with respect to each other.

5. A repair link comprising two complementary links adapted to be superimposed to form a single link, each of said links having an inwardly extending projection extending toward the opposite end of said link, the said projections overlapping each other, and means for securing said projections together to form a brace against longitudinal stresses imposed on said links.

6. A repair link comprising two complementary links adapted to be superimposed to form a single link, each of said links having an inwardly extending projection extending toward the opposite end of said link, and means for securing said projections together to form a brace against longitudinal stresses imposed on said links.

In witness whereof, I hereunto subscribe my name this 11th day of August, 1920.

HUGH E. JONES.

Witnesses:
H. B. Ogood,
W. A. Harmon.